United States Patent [19]

Matsumoto

[11] 3,760,511

[45] Sept. 25, 1973

[54] EDUCATIONAL DEVICE
[75] Inventor: Teruo Matsumoto, Tokyo, Japan
[73] Assignee: Epoch Company Ltd., Tokyo, Japan
[22] Filed: May 26, 1972
[21] Appl. No.: 257,224

[52] U.S. Cl. .............................................. 35/22 A
[51] Int. Cl. ............................................ G09b 19/00
[58] Field of Search ................ 35/22 A, 73; 46/1 A; 273/130 R, 136 C

[56] References Cited
UNITED STATES PATENTS
2,963,796    12/1960    Zalkind............................. 35/22 A
3,710,455    1/1973    Liversidge et al. ................ 35/22 A Primary Examiner—Harland S. Skogquist
Attorney—Harry John Staas et al.

[57] ABSTRACT

An educational device featuring a housing provided with a plurality of openings of different configuration and blocks of corresponding configuration to be matched with the openings and inserted therein. The housing is provided with means for closing and inserted openings within which blocks have not been inserted after a predetermined period of time signalling the end of the game.

4 Claims, 6 Drawing Figures

EDUCATIONAL DEVICE

BACKGROUND OF THE INVENTION

The present invention relates generally to educational devices wherein the child develops recognition and coordination skills by matching blocks of different configuration with corresponding openings for receiving same. Speed is encouraged and the interest of the child maintained since a predetermined time limit is set for matching the series of blocks with the openings.

SUMMARY OF THE INVENTION

The housing of the educational device is provided with a plurality of openings of different configuration, for example, squares, circles and triangles. The object is to insert blocks of corresponding configuration into the openings. A timing mechanism is employed which exposes the openings for a predetermined period of time after which the unoccupied openings are closed preventing further play. In this manner, the child is encouraged to complete the matching process as quickly as possible.

Figure 1:
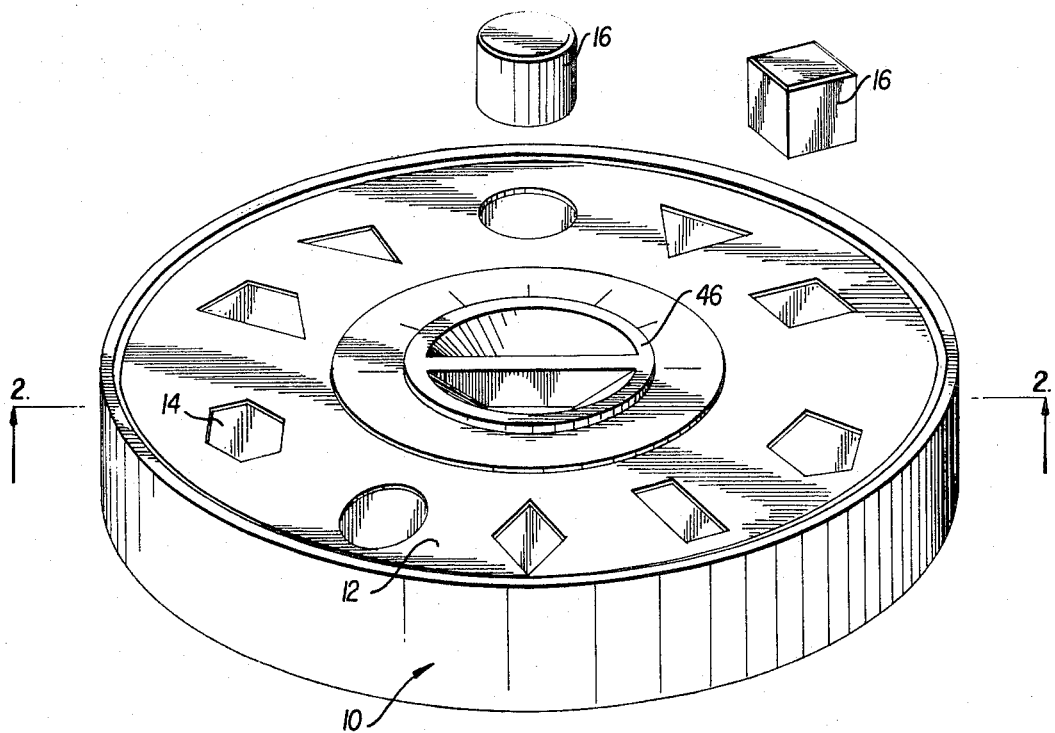
FIG. 1 is a perspective view of the educational device embodying the present invention illustrating in particular the openings formed within the top of the housing and several of the blocks of corresponding configuration to be inserted therein, together with the control knob in the center of the housing used to expose the openings and start the timing mechanism.
Figure 2:
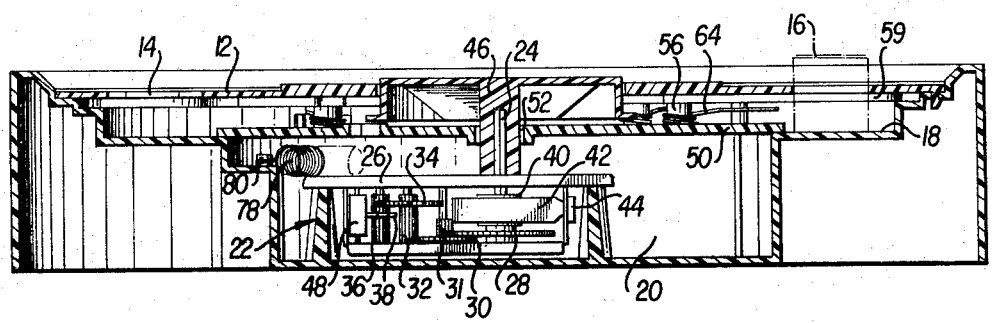
FIG. 2 is a cross-sectional view taken along line 2—2 of FIG. 1 illustrating the working mechanism of the educational device.

DESCRIPTION OF THE PREFERRED EMBODIMENT:

The educational device of the present invention comprises a housing 10 having a top face 12 provided with a plurality of openings 14 of different configuration designed to accommodate blocks 16 of similar configuration. As illustrated in FIG. 2, the housing 10 is provided with a shelf 18 spaced downwardly from the top face 12 upon which the blocks 16 rest after being inserted through the openings 14. The object of the educational device is for the child to match and then insert each of the blocks 16 through its corresponding opening 14 within a given time interval, as explained in detail hereinafter.

Figure 5:
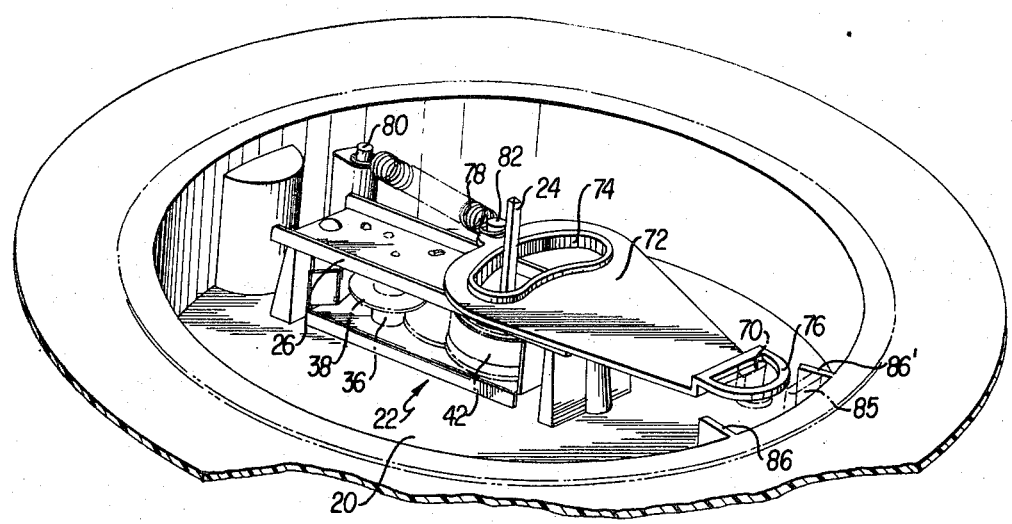
FIG. 5 is a perspective view of the housing with its top face containing the openings and the rotating plate removed illustrating the mechanism for exposing the openings for a predetermined time and thereafter closing same.

As illustrated in FIGS. 2 and 5, the bottom of the housing 10 is provided with a well 20 within which is mounted a spring-loaded mechanism generally designated by the reference numeral 22 for rotating the shaft 24. In particular, the mechanism 22 comprises a chassis 26 having upper and lower supports between which are mounted for rotation gears wheels 28, 30, 31, 32, 34, 36 and 38. At the lower end of the shaft 24 is positioned a collar 40 around which a spring 42 is wound. One end 44 of the spring 42 is secured to the chassis 26 while the other end thereof is secured to the collar 40.

As will be apparent, as the shaft 24 is rotated clockwise the spring 42 is tightened. After being released, the force of the unwinding spring 42 imparts a counterclockwise movement to the shaft 24 and the gear 28 which meshes with the gear 31 causing same to rotate clockwise in turn causing the wheel 30 to rotate clockwise. The wheel 30 meshes with and causes the gear wheel 32 to turn counterclockwise in turn rotating the gear wheel 34 counterclockwise which in turn meshes with the gear 36 rotating same clockwise which in turn rotates the gear 38 clockwise.

As the control knob 46 which is slidably mounted on the shaft 24 is turned clockwise, the spring 42 is wound. Upon release of the control knob 46, the force of the unwinding spring 42 causes the control knob 46 to rotate counterclockwise and the gear wheels to turn as previously described. As the last gear wheel 38 rotates, its teeth strike a pivotably mounted blade 48 causing same to flutter in such a manner as to simulate the clicking of a timing mechanism.

Figure 3:
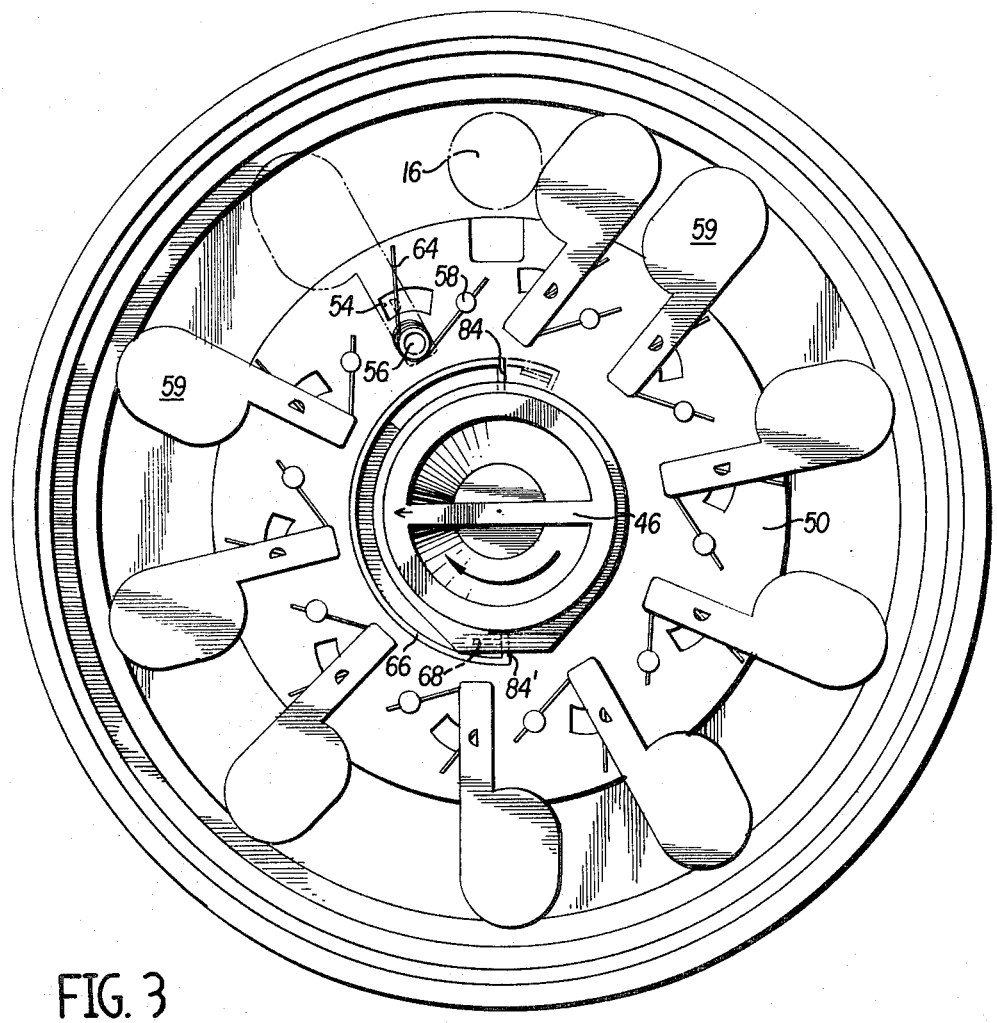
FIG. 3 is a top plan view of the housing of the educational device with its top face containing the openings removed to illustrate the spring biased, rotating gates located below each of the openings which permit for a predetermined time the blocks to be inserted within the openings, thereafter closing the openings.
Figure 4:
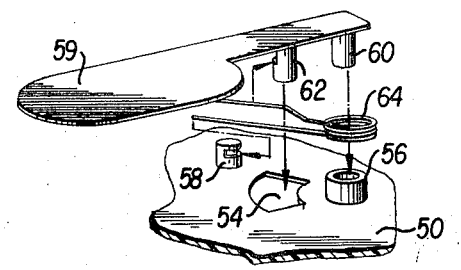
FIG. 4 is a perspective view of one of the movable gates illustrating its attachment to a plate mounted for rotation within the housing permitting the gate to sequentially expose and close one of the openings and the spring biasing mechanism permitting the gate to remain open if its corresponding opening is occupied with a block.

A disk generally designated by the reference numeral 50 in FIG. 3 is positioned upon the shoulder 18 of the housing 10 and is provided with a central opening 52 through which the shank of the control knob 46 protrudes. The disk 50 is provided with a plurality of openings 54 and raised supports 56 and 58, as seen in FIG. 4. The gates 59 are normally positioned below the openings 14 in the top plate 12 so as to close same. Each of the gates 59 includes a first depending cylindrical member 60 which fits within the hollow support 56 and a second depending cylindrical member 62 which fits within the opening 54 so as to define the path of rotation of each gate 59. One end of each spring 64 passes through the support 58 while the other end thereof is biased against the depending cylindrical member 62. As will be apparent from FIG. 4, the central wound portion of each spring 64 is positioned about the support 56. Each of the members 59 is thus biased by its spring 64 in a counterclockwise direction, as seen in FIG. 3.

Figure 6:
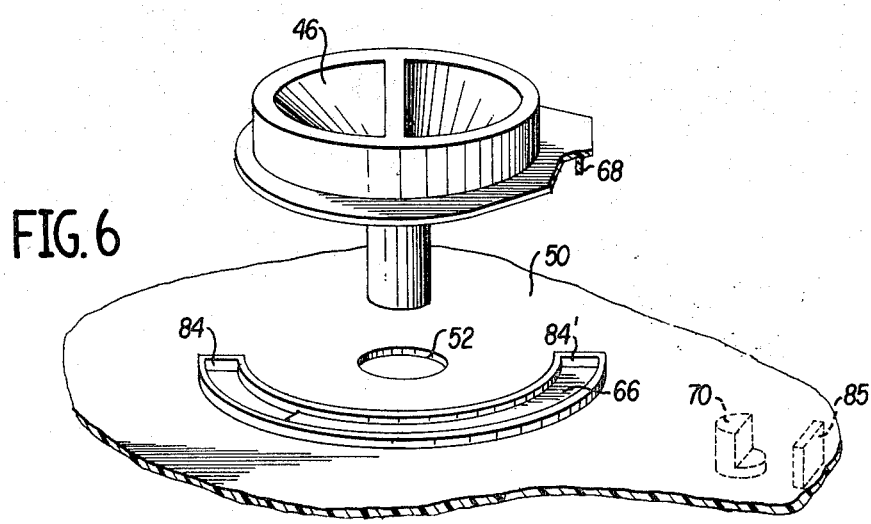
FIG. 6 is a perspective view of the plate and the control knob for rotating same.

The disk 50 is further provided with a semi-circular channel 66 as seen in FIGS. 3 and 6. Channel 66 accommodates the flange 68 which depends from the control knob 46.

The underside of the disk 50 is provided with a depending flange 70, as illustrated in phantom in FIG. 5. Interposed between the bottom of the disk 50 and the chassis 26 of the gear train is a sliding support 72 provided at one end with a curvilinear opening 74 through which the shaft 24 passes and at the other end with an opening 76 fitted around the flange 70 which depends from the disk 50. Finally, a spring 78 is secured at one end to a support 80 formed as a part of a housing and at the other end to the knob 82 formed as a part of the support 72. The spring biased, sliding support 72 resiliently mounts the rotating disk 50 between the first position in which the bead 85 which depends from the disk 50 abuts the flange 86 at which time the gates 59 are rotated out of position with the openings 14 exposing same and the second position in which the bead 85 abuts the flange 86' at which time the gates 59 block the openings 14.

The operation of the educational device of the present invention will now be described. Normally, the disk 50 is positioned such that the gates 59 are disposed directly below the openings 14. In this position, the blocks 16 cannot be inserted in place. The player then turns the knob 46 clockwise until the depending flange 68 strikes the abutment 84 formed at the end of the channel 66 in the disk 50. The player continues to rotate the knob 46 in turn rotating the disk 50 clockwise until the bead 85 formed on the underside of the disk 50 strikes the flange 86 formed as a part of the housing 10, as illustrated in FIG. 5. The dimensional relationship between the bead 85 and the flange 86 is such that as the bead 85 strikes the flange 86 the gates 59 are rotated along with the disk 50 a few degrees so as to expose the windows 14. The play then begins as the child attempts to match each of the blocks 16 with its corresponding opening 14 during which time the unwinding spring 42 causes the shaft 24 and its control knob 46 to rotate counterclockwise. During the rotation of the control knob 46 the teeth of the gear wheel 38 strike the blade 48 causing same to click simulating the ticking of a clock. The child is aware of approximately how much time remains since the top plate 12 is provided with markings indicating graduated seconds and the control knob 46 is provided with a pointer. Just before the control knob 46 completes its counterclockwise rotation its depending flange 68 strikes the abutment 84' formed at the other end of the channel 66 of the disk 50. The counterclockwise rotation of the control knob 46 continues and causes the disk 50 to rotate counterclockwise under the influence of the spring biased, sliding support 72 until the bead 85 formed on the underside of the disk 50 strikes the flange 86'. During this time, the gates 59 rotate back to their original position directly below the windows 14 signaling the end of the game.

During the allotted time the child has no doubt correctly matched certain of the blocks 16 with the openings 14. The counterclockwise rotation of the disk 50 signaling the end of the game does not interfere with those of the blocks 16 that have been correctly matched within the openings 14 since those gates 59 adjacent the matched blocks 16 simply remain in abutting position against the matched blocks 16, the springs 64 permitting the gates 59 to rotate clockwise about their cylindrical portions 60. As the correctly matched blocks 16 are removed to begin the game anew, the springs 64 rotate the gates 59 counterclockwise to their original position illustrated in FIG. 3.

I claim:

1. An education device, comprising:
   a housing;
   a plurality of openings of different configuration provided within said housing;
   a plurality of blocks corresponding in configuration to said openings to be matched with said openings and inserted therein; and
   means exposing said openings for a predetermined time and thereafter closing those of said openings into which said blocks have not been inserted comprising gates located below said openings, means mounting each of said gates for movement between a first position wherein said gates are directly below said openings blocking same and a second position to the side of said openings exposing same, and means moving said gates to said second position and after a predetermined time causing said gates to attempt to move to said first position, the correct positioning of any of said blocks within their corresponding openings preventing their corresponding gates from moving to said first position, while said gates corresponding to those of said openings into which corresponding blocks have not been inserted are free to move to said first position.

2. An educational device as in claim 1, wherein said means mounting said gates comprises a disk, means mounting said gates for rotation with respect to said disk and normally biasing said gates in one direction and means mounting said disk for rotation within said housing between a first position wherein said gates assume their said first position directly below said openings blocking same and a second position wherein said gates assume their said second position to the side of said openings exposing same.

3. An educational device as in claim 1, wherein said means exposing said openings for a predetermined time comprises a timing mechanism and means operatively connecting said timing mechanism and said gates for moving said gates from said second to said first positions.

4. An educational device as in claim 1, wherein said means exposing said openings for a predetermined time comprises a control handle, means mounting said control handle for rotation, spring means normally biasing said control handle in a first position permitting said control handle to be rotated to a second position after which said control handle moves back to said first position, means operatively connecting said control handle and said disk such that said first and second positions of said control handle and said disk, respectively, are coordinated.

* * * * *